United States Patent
Gavrilov (10) Patent No.: US 11,338,638 B2
(45) Date of Patent: May 24, 2022

(54) VEHICLE SUSPENSION HAVING CONTROLLABLE GROUND CLEARANCE AND RIGIDITY

(71) Applicant: Aleksei V. Gavrilov, Sankt Petersburg (RU)

(72) Inventor: Aleksei V. Gavrilov, Sankt Petersburg (RU)

( * ) Notice: Subject to any disclaimer, the term of this patent is extended or adjusted under 35 U.S.C. 154(b) by 0 days.

(21) Appl. No.: 17/048,090

(22) PCT Filed: Feb. 11, 2020

(86) PCT No.: PCT/IB2020/000024
§ 371 (c)(1),
(2) Date: Oct. 15, 2020

(87) PCT Pub. No.: WO2020/165644
PCT Pub. Date: Aug. 20, 2020

(65) Prior Publication Data
US 2021/0370740 A1   Dec. 2, 2021

(30) Foreign Application Priority Data

Feb. 12, 2019   (RU) .......................... RU2019103888

(51) Int. Cl.
*B60G 17/02*      (2006.01)
*B60G 11/14*      (2006.01)
*B60G 17/015*     (2006.01)

(52) U.S. Cl.
CPC ............ *B60G 17/021* (2013.01); *B60G 11/14* (2013.01); *B60G 17/0157* (2013.01);
(Continued)

(58) Field of Classification Search
CPC   B60G 17/015; B60G 17/0157; B60G 17/021; B60G 11/14; B60G 2500/20;
(Continued)

(56) References Cited

U.S. PATENT DOCUMENTS

| 2,991,066 A | | 7/1961 | Fenton |
| 5,183,285 A | * | 2/1993 | Bianchi ................. B60G 11/32 |
| | | | 280/124.158 |

(Continued)

FOREIGN PATENT DOCUMENTS

| CN | 105555559 A | * | 5/2016 | ........... B60G 15/063 |
| DE | 10255764 B3 | * | 2/2004 | ........... B60G 15/063 |

(Continued)

OTHER PUBLICATIONS

Schmidt Roland. 'Translation of WO 2017097655 A1 Obtained Oct. 14, 2021'. Jun. 15, 2017. Entire Document. (Year: 2017).*

*Primary Examiner* — James A English
*Assistant Examiner* — Scott F. Underwood
(74) *Attorney, Agent, or Firm* — John Alumit (57) ABSTRACT

The invention relates to a suspension for motor vehicles having controllable chassis clearance and stiffness, and includes a helical spring (1), having a controlling device (2) which is secured to the body of the vehicle and is located rotatably, preferably by means of a transmission stage driven by an electric motor. The controlling device (2) is embodied as a shaped nut, which is screwed directly onto the coils of the preferably cylindrical helical spring (1) and has roller bodies which are located along the helical line and are connected to coils of the helical spring; the controlling device (2) is fully movable and fixable onto and relative to the helical spring. The suspension for motor vehicles ensures enhanced stiffness of the suspension in the event of a decrease in the chassis clearance, reduced stiffness of the suspension when the chassis clearance is increased, and the possibility of building in a telescoping damper inside the helical spring without blocking access to its upper fastening point.

7 Claims, 5 Drawing Sheets

(52) U.S. Cl.
CPC ...... *B60G 2202/12* (2013.01); *B60G 2202/42* (2013.01); *B60G 2204/127* (2013.01); *B60G 2204/418* (2013.01); *B60G 2204/4191* (2013.01); *B60G 2204/4193* (2013.01); *B60G 2500/20* (2013.01); *B60G 2500/30* (2013.01)

(58) Field of Classification Search
CPC ........ B60G 2500/30; B60G 2204/4191; B60G 2204/127; B60G 2204/4193; B60G 2204/418; B60G 2202/42; B60G 2202/12
See application file for complete search history.

(56) References Cited

U.S. PATENT DOCUMENTS

| | | | | |
|---|---|---|---|---|
| 7,926,822 | B2 * | 4/2011 | Ohletz | B60G 15/063 |
| | | | | 280/5.514 |
| 2009/0045595 | A1 * | 2/2009 | Michel | B60G 17/021 |
| | | | | 280/6.157 |
| 2009/0065314 | A1 * | 3/2009 | Kondo | F16F 9/18 |
| | | | | 188/290 |
| 2009/0261542 | A1 * | 10/2009 | McIntyre | B60G 17/021 |
| | | | | 280/6.157 |
| 2011/0210525 | A1 * | 9/2011 | Michel | B60G 17/021 |
| | | | | 280/5.5 |
| 2011/0298168 | A1 * | 12/2011 | Groebner | F16F 9/56 |
| | | | | 267/217 |
| 2013/0020748 | A1 * | 1/2013 | Kohlhauser | B60G 17/0157 |
| | | | | 267/217 |
| 2014/0167372 | A1 * | 6/2014 | Kim | B60G 99/002 |
| | | | | 280/6.157 |
| 2016/0200162 | A1 * | 7/2016 | Luczak | B60G 17/0272 |
| | | | | 280/6.157 |
| 2019/0226562 | A1 * | 7/2019 | Hochmuth | F16C 19/30 |

FOREIGN PATENT DOCUMENTS

| | | | | |
|---|---|---|---|---|
| DE | 102007060422 | A1 * | 6/2009 | ........... B60G 17/021 |
| DE | 102008060477 | A1 * | 6/2010 | ........... B60G 17/021 |
| DE | 102009047100 | A1 * | 5/2011 | ........... B60G 17/021 |
| DE | 102009047134 | A1 * | 5/2011 | ............. B60G 11/00 |
| DE | 102013210556 | A1 * | 5/2014 | ........ B60G 17/0565 |
| DE | 102015214161 | A1 * | 2/2017 | ........... B60G 17/021 |
| DE | 102015224527 | A1 | 6/2017 | |
| DE | 102016105959 | A1 * | 10/2017 | ............. B60G 11/14 |
| EP | 1970228 | A1 * | 9/2008 | ............. F16F 15/02 |
| FR | 2677929 | A1 * | 12/1992 | ............. B60G 11/14 |
| FR | 3017337 | A1 * | 8/2015 | ............. F16F 1/128 |
| JP | 2001088527 | | 4/2001 | |
| JP | 2001301436 | A * | 10/2001 | |
| JP | 2004017769 | A * | 1/2004 | |
| SU | 1384417 | A1 * | 3/1988 | |
| WO | WO-2009136509 | A1 * | 11/2009 | ................ F16F 9/56 |
| WO | WO-2017097655 | A1 * | 6/2017 | ......... B60G 17/0157 |

* cited by examiner

VEHICLE SUSPENSION HAVING CONTROLLABLE GROUND CLEARANCE AND RIGIDITY

The invention relates to a vehicle suspension that has an adjustable (controllable, variable) chassis clearance. It relates in particular to controllable suspensions with electric power trains that have a transmission. Suspensions of this type are employed primarily in passenger vehicles, light trucks, and electrically driven vehicles (electric vehicles).

Controllable suspensions with controllable (variable) chassis clearance (level control) are widely known. They make it possible to achieve novel suspension properties, specifically the following:
increasing or decreasing the chassis clearance of the vehicle body, and
increasing or reducing the stiffness of the suspension.

In the suspensions mentioned, pneumatic or hydraulic systems are currently used. These systems are not widely employed, since they are complicated and expensive. Consequently, there is a need for simpler solutions. The latest trend is to replace hydraulic systems with electric power trains. For instance, spring suspenders with a power screw pair and an electric power train with a transmission are offered. Fundamentally, in such suspensions both a spring and a screw jack are employed. The screw of a screw jack is coupled to the vehicle body via roller bearings. The female screw serves as a bearing support for the upper spring plate of the suspension. When the screw is turned, the height level of the female screw and of the spring plate changes. As a result, the chassis clearance beneath the vehicle body changes.

In similar controllable suspensions, it is not only their simple construction that is considered advantageous. Such suspensions are also distinguished by greater energy efficiency in comparison to pneumatic and hydraulic systems. This is an especially attractive advantage for the use of such systems in electric cars.

A suspension for motor vehicles that has variable chassis clearance is known (see patent DE 102 55 764 B3, IPC B60G 17/00, B60G 17/015, published on Feb. 26, 2004). This suspension includes a spring and an electric motor with a thin-walled rotor. An upper impact spring plate is mounted inside the rotor. The plate is supported from below on a nut. The nut is coupled with a small-thread bush. The small-thread bush rotates together with the rotor. A damper rod extends inside the threaded bush.

In the known suspension, the stiffness of the spring does not change with the change in the vehicle body height. The power assembly is located in a region that is subjected to the strongest oscillations and impact loads from the wheel. The location of the pair of screws of the screw jack beneath the spring thus makes it harder to protect the work surfaces of the pair of screws against getting dirty.

A suspension for motor vehicles with variable chassis clearance is known (see patent application JP 2001 301436 A, IPC B60G 11/16, B60G 15/06, B60G 17/02, published on Oct. 31, 2001). This suspension includes a cylindrical spring. The cylindrical spring is secured between the spring plates. With its lower spring plate, the cylindrical spring is braced on a nut. Below the spring, a power assembly in the form of a pair of screws of the screw jack is mounted. The screw jack is set into rotation with the aid of a drive, such as an electric motor with a transmission.

The disadvantage of the known suspension resides in the invariable stiffness of the spring when there is a change in the vehicle body clearance. The threaded power assembly is located in a region that is subjected to impact loads from the wheel. Furthermore, it is difficult to protect the working surfaces of the pair of screws from getting dirty.

A suspension for motor vehicles with variable chassis clearance is also known (see patent application DE 10 2015 214161 A1, IPC B60G 15/06, B60G 15/06, B60G 17/02, B60G 17/02, published on Feb. 2, 2017). This suspension includes a cylindrical spring. A lower spring plate of the cylindrical spring is braced on a nut of a screw jack that has a power train. The power train of the screw jack is mounted laterally below the spring in the lower part of the suspension strut.

In this known suspension, the capability of varying the stiffness of the suspension when controlling the vehicle body height is not achieved. The screw jack with the power train is located in a region that is subject to the most intense rattling and considerable impact loads.

A suspension for motor vehicles with adjustable chassis clearance is also known (see patent application PCT WO 2010/049026 A1, IPC B60G 15/06, B60G 17/015, B60G 17/02, F16F 09/38, published on May 6, 2010). This suspension includes a primary spring and an auxiliary spring. The primary spring is braced at the bottom on a screw jack nut. The auxiliary spring is located above between the screw jack nut and the vehicle body. The screw jack is equipped with an electric power train.

This arrangement of the screw jack nut between the primary and the auxiliary spring in the known suspension makes it possible:
to relieve the burden on the screw jack,
to reduce the effort of driving the screw jack, and
to increase the action speed of the screw jack.

However, in this known suspension, the possibility of varying the spring stiffness when controlling the chassis clearance is not ensured. Introducing a plurality of springs into the construction of the suspension makes the suspension substantially more complicated. Both the vibration and the rattling are transmitted directly to the electric power train via the screw of the screw jack. As a result, the reliability of the electric power train is adversely affected.

A suspension for motor vehicles with variable chassis clearance is also known (see patent application JPH08197931 A, IPC B60G 15/06, B60G 17/00, B60G 17/02, published on Aug. 6, 1996). This suspension includes a primary spring and two auxiliary springs. A screw jack with an electric power train is coupled to the vehicle body via the auxiliary springs.

This known suspension makes it possible to adjust both the chassis clearance and the spring stiffness. However, that is achieved by complicating the suspension construction. The arrangement of the power assembly along the mechanical axis precludes locating a spring damper centrally. Both the vibration and rattling are transmitted from the wheel directly to the electric power train by way of the screw of the screw jack. As a result, the reliability of the electric power train is adversely affected.

Suspensions for motor vehicles with variable chassis clearance are also known. In such suspensions, a pair of screws is formed by the coils of the spring itself with the thread portion of the nut or screw in a special embodiment. A suspension for motor vehicles with variable chassis clearance is known (see inventor certificate SU 1384417 A1, IPC B60G 17/04, published on Mar. 30, 1988). This suspension includes a cylindrical spring, a screw brace, a drive or the screw brace, and indicators for the static position of the vehicle part. The screw ends of the screw brace are screwed into the spring and into a portion of the vehicle. When the vehicle is in a static position, the indicators meet. The stiffness of the spring corresponds to the static load acting on it. When the screw is screwed in or out, the number of effective spring coils is decreased or increased. As a result, the spring stiffness is changed. In this case, the chassis clearance changes only slightly. The change in the chassis clearance is effected solely on the basis of the change in the spring stiffness. This is because the screw, on being screwed in or out, is shifted vertically relative to both the vehicle body and the spring.

The known suspension has the following deficiencies. While the stiffness of the spring can vary over a fairly wide range, the range of variation of the chassis clearance remains relatively narrow. Two screw connections indicate a greater resistance to the turning of the screw and therefore require a very efficient power train. This makes it difficult, in vehicles with control of the suspension, to use the known suspension while the vehicle is in motion. When the screw is turned, it is possible to twist and rotate the spring. This has an adverse affect on the controlling procedure. This is especially critical for the screw in the upper position.

A device for adjusting the height of a vehicle wheel suspension is also known (see patent application DE 10 2015 224 527 A1).

The wheel suspension described in this has a cylindrical main spring between two spring plates. The wheel suspension furthermore has a cylindrical adjusting spring that has disk coils and that is located beneath the lower spring plate of the main spring. With the aid of this adjusting spring, the lower spring plate is adjustable along a longitudinal axis of the wheel suspension.

For adjustment, the coils of the adjusting spring are guided via a support ring disk of a support ring pot, this pot being located around a damping part connected to the lower spring plate of the main spring, and has roller bearings. The coils above this support ring disk are compressed against one another. The entire adjusting spring is split into the compressed portion and an uncompressed portion below the support ring disk.

The compressed part here serves as a thrust bearing for the lower spring plate of the main spring. By rotating the support ring pot with the support ring disk, it is thus possible to increase or decrease the number of compressed coils of the adjusting spring below the lower spring plate of the main spring. As a result, the chassis clearance of the vehicle is adjusted. In that process, coils that are more or less compressed are formed, and as a result for one thing the chassis clearance of the vehicle and for another the maximum spring travel are adjustable. However, the stiffness of the main spring cannot be affected by this means.

The wheel suspension has the following deficiencies: The stiffness of the main spring of the wheel suspension does not vary when the chassis clearance is controlled. The adjusting spring, which is meant to make kinks in a coil possible between a compressed and a uncompressed portion, can be made only from a flexible, fairly thin strip.

However, this means that a rotation of the support ring pot is equivalent to only a slight change in the height, and as a result the spring controlling procedure takes longer.

Furthermore, the dynamic characteristics of the controlling procedure when the vehicle is being driven are adversely affected, since the controlling device is located below the lower end of the leaf spring on the movable part of the wheel suspension. As a result, all the electromechanical structural groups of the apparatus are exposed to the adverse effect of the oscillations and impact loads transmitted from the wheel of the vehicle.

A suspension for motor vehicles with variable chassis clearance is also known (see patent RU 2 458 802 C2, IPC B60G 17/15, B60G 17/02, published on Aug. 20, 2012). This suspension has the most essential features in common with the subject of the present patent application. It was therefore chosen as a prototype for further development. This prototype suspension includes a cylindrical helical spring. The cylindrical helical spring is provided with a controlling device. The controlling device is secured to the body of the vehicle. The controlling device interacts with the drive motor via a transmission stage. The controlling device is embodied in the form of a ball thread drive. The ball thread drive includes a controlling bush and a ball nut. The controlling bush can be set into rotation by the drive motor. The controlling bush serves to adjust the plate of the cylindrical helical spring. The ball nut is located radially outside the controlling bush and inside the cylindrical helical spring.

The known prototype suspension has the following deficiencies:
   the stiffness of the spring does not vary when the chassis clearance is varied; and
   the controlling device blocks off the upper end face of the spring. As a result, it is to mount a telescoping damper inside the spring.

The object of the present invention was to develop a suspension for vehicles with controllable chassis clearance and stiffness. A suspension of this kind should ensure increased stiffness of the suspension upon a reduction in the chassis clearance. Furthermore, it is meant to ensure reduced stiffness of the suspension if the chassis clearance is increased. The goal is to make it possible to install a telescoping damper inside the spring, without blocking off access to the upper fastening point of the damper.

This stated object is attained by the features of claim 1.

The controlling device is embodied as a shaped nut, which is screwed directly onto the coils of the preferably cylindrical helical spring. The controlling device has roller bodies. The roller bodies are located along the helical line and are connected to coils of the helical spring. The controlling device is fully movable and fixable onto and relative to the helical spring. The controlling device can be located movably entirely between a first and second end of the helical spring. The shaped nut is embodied by two coaxial cylindrical bushings, which are connected with the aid of bolts along the helical lines. Upper load rollers and lower support rollers are secured rotatably to the bolts as roller bodies. The upper load rollers and the lower support rollers are connected to the spring coils.

The shaped nut can also be embodied by two coaxial cylindrical bushings that are connected to one another and that have guide lugs and movable rods located between the guide lugs, the rods having springs located thereon. The rods are solidly connected to bolts via braces that prestress the springs. Load rollers are secured rotatably as roller bodies to the bolts, and the load rollers are connected to the spring coils.

In such a controlling device, not only cylindrical helical springs but also non-cylindrical springs can be employed. These include for instance conical springs and barrel springs. For that purpose, coaxial cylindrical bushings with an increased radial gap are used.

The roller bodies can be located movably along their axis of rotation, preferably along the bolts. This movability ensures the operation of the controlling device with non-cylindrical helical springs, for instance with conical or barrel-shaped springs. By rotating the shaped nut, the rollers can be displaced radially.

The transmission stage of the drive motor n be is embodied as a worm gear.

The transmission stage of the drive motor can be embodied as a planetary gear, which is located for instance inside the helical spring.

A flexible coiled hose which covers the coils of the helical spring is secured between the controlling device and a spring plate located below the helical spring.

A flexible brace can be secured to the underside of the controlling device; it wraps around a damper of the suspension and has the sliding sealing elements which prevent the entry of dirt into the interior of the shaped nut.

The present suspension for motor vehicles with variable chassis clearance will now be described in further detail in conjunction with the drawings. In the drawings.

Figure 1:
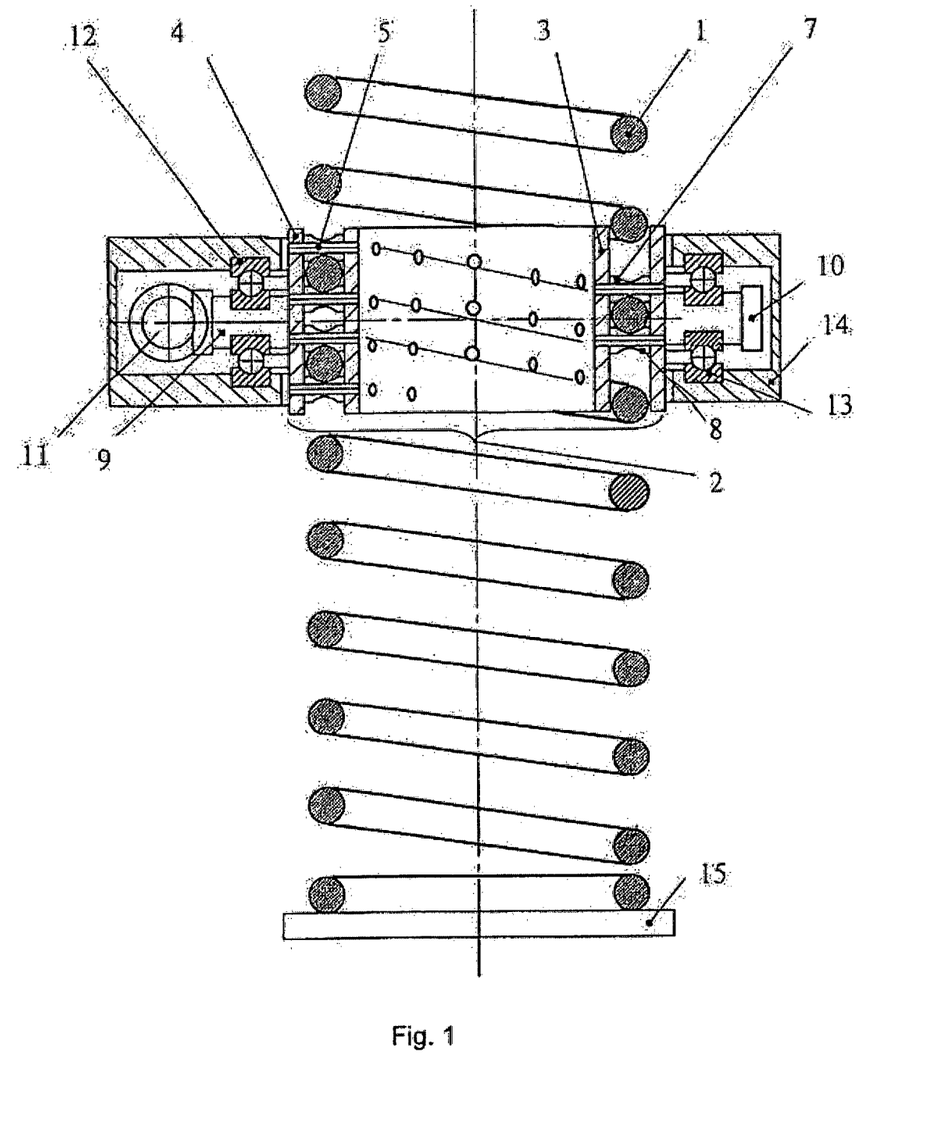
FIG. 1 is a first embodiment of the controlling device in longitudinal section; the controlling device is connected to the coils of a cylindrical helical spring.
Figure 2:
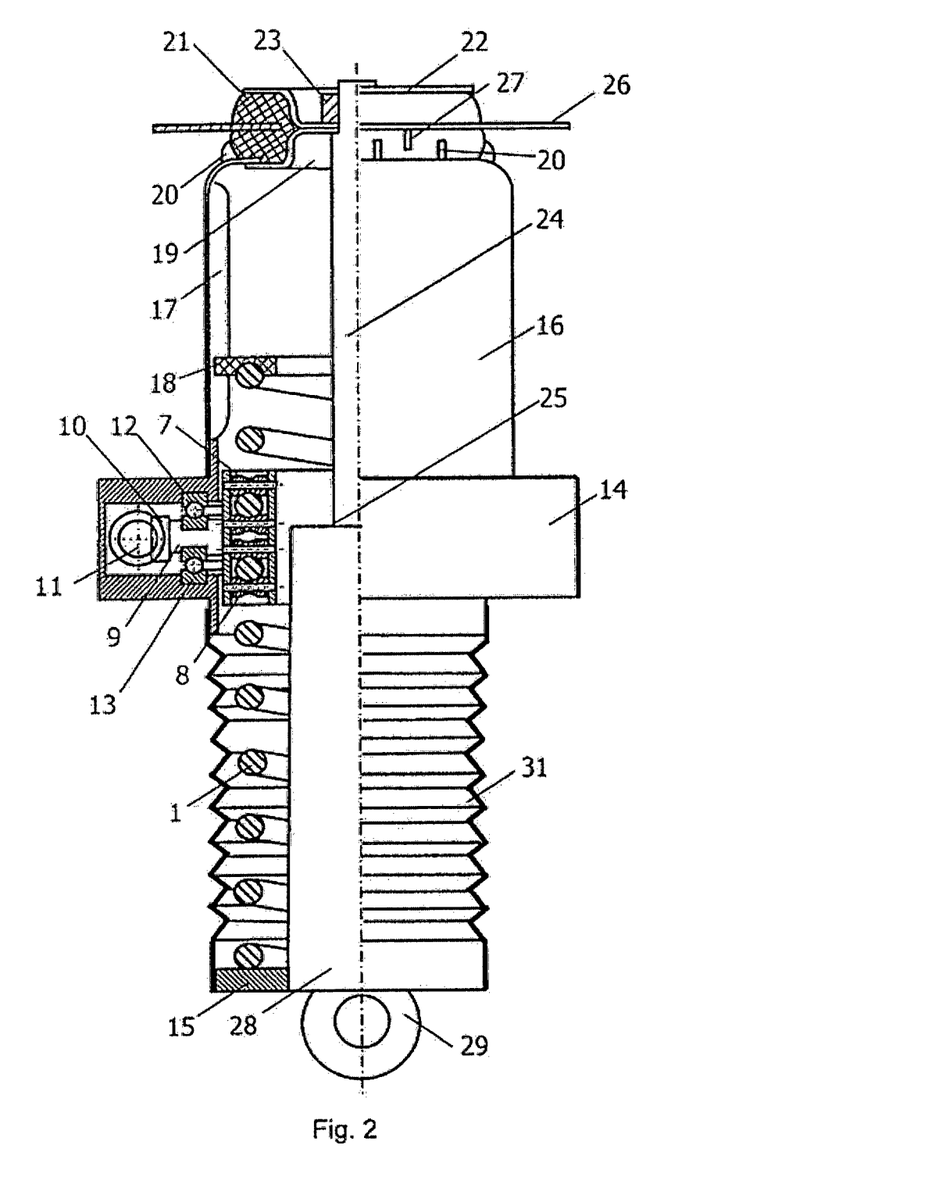
FIG. 2 shows the vehicle suspension of the invention with the controlling device of the first embodiment, constructed together with the damper, in partial longitudinal section.
Figure 3:
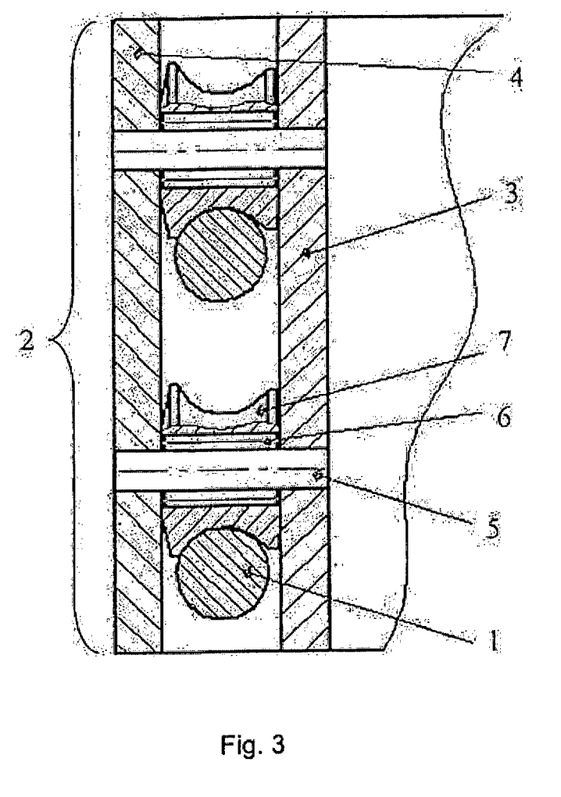
FIG. 3 shows a part of the controlling device of the first embodiment on a larger scale in longitudinal section.

The present first embodiment of the vehicle suspension with variable chassis clearance, shown in FIGS. 1 through 3, primarily includes a cylindrical helical spring 1. A controlling device 2 is screwed onto the coils of the helical spring 1. The controlling device 2 is secured to the vehicle body (not shown in the drawings). The controlling device 2 is embodied as a shaped nut. The shaped nut is formed of two coaxial cylindrical bushings (an inner bushing 3 and an outer bushing 4). The cylindrical bushings can be fixedly connected to one another along the screw lines with the aid of bolts 5. The incline of the screw lines must preferably be set as 8-12% less than the coil height of the helical spring 1. Upper load rollers 7 and lower support rollers 8 can be located on the bolts 5. The load rollers 7 and the support rollers 8 are built in rotatably, for instance in needle bearings 6 (see FIG. 3), and can also be movable along the bolts 5. The upper load rollers 7 and the lower support rollers 8 are connected to the coils of the cylindrical helical spring 1. The upper load rollers 7 and the lower support rollers 8 are located in a range of from one coil to one and a half coils of the cylindrical helical spring 1. The rollers can be installed widely apart and away from one another. The load rollers 7 and the support rollers 8 can have an annular indentation in the middle. The load rollers 7 can have a greater diameter then. A flange 9 is secured, preferably by welding, to the outer cylinder 4. The flange 9 has a drive collar 10, for example a drive collar of a worm wheel or of a profiled engagement face of some other transmission. The drive collar 10 engages a drive shaft 11 of the drive motor, such as an electric motor (not shown in the drawings). The flange 9 is built in between an upper ball pressure bearing 12 and a lower ball support bearing 13. The upper ball pressure bearing 12 and the lower ball support bearing 13 are located in one housing 14. A spring plate 15 is located below the helical spring 1. The spring plate 15 bears the load of the helical spring 1.

Figure 4:
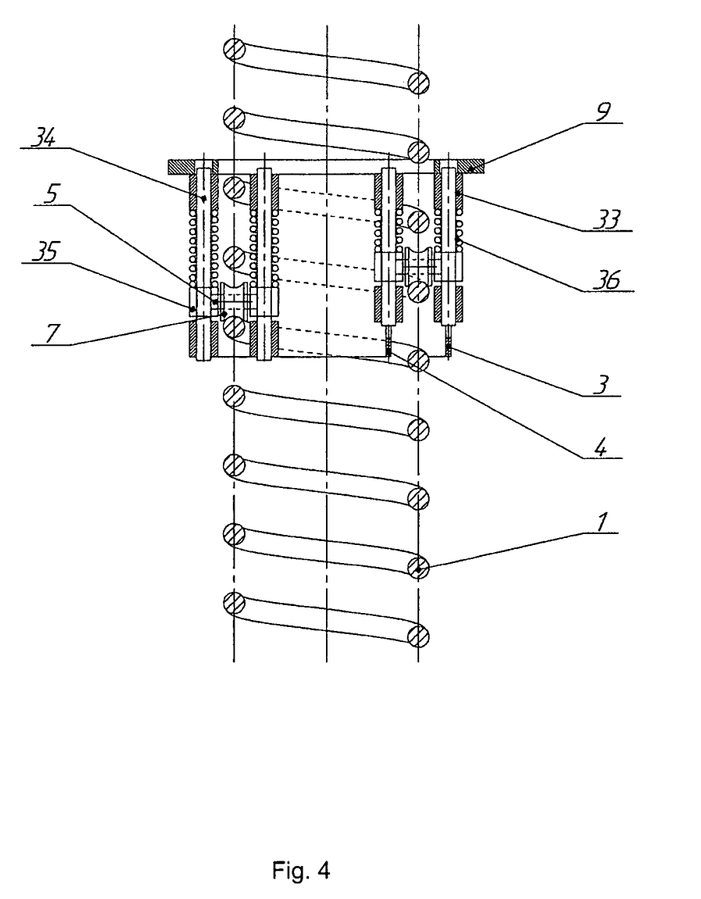
FIG. 4 shows a second embodiment of the controlling device in longitudinal section, in which the controlling device is connected to the coils of a cylindrical helical spring.
Figure 5:
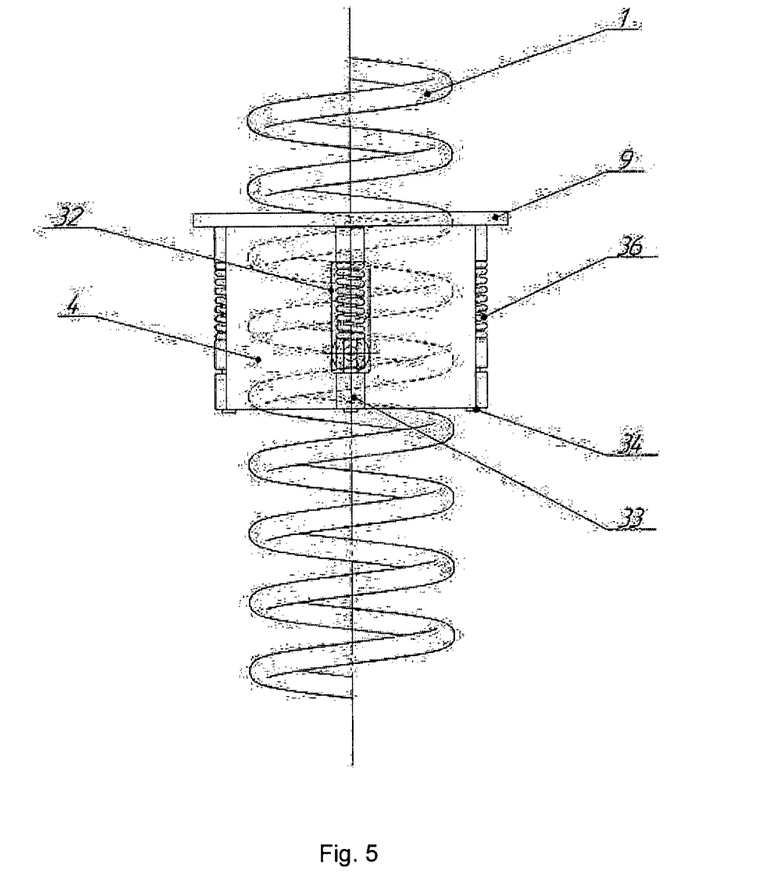
FIG. 5 shows a side view of the controlling device of the second embodiment, which illustrates the outer cylindrical bushing with lugs and openings for removable rods.

In FIGS. 4 and 5, a second embodiment of the vehicle suspension with variable chassis clearance is shown with reference to the shaped nut construction.

Here, the aforementioned support rollers 8 are not implemented. The coaxial cylindrical bushings that form the shaped nut (one inner bushing 3 and one outer bushing 4) can be joined to one another via a flange 9 and additional connecting members (not shown in the drawings).

The cylindrical bushings 3 and 4 include guide lugs 33. In and between these guide lugs 33, there are movable rods 34. Via braces 35, the rods 34 are fixedly connected to bolts 5 and to the load rollers 7, located rotatably thereon. The braces 35 prestress the springs 36. The load rollers 7 can be movable along the bolts. In FIG. 5, openings 32 are shown, which are embodied in the walls of the cylindrical bushings 3, 4. The openings 32 make it possible to place the springs 36 and the braces 35. The braces 35 can be mounted and unmounted, and the construction of the braces 35 makes it possible to fix the bolts 5, load rollers 7 and rods 34 rigidly.

The suspension according to the invention is embodied as a complete structural group (a composite unit). The controlling device 2 is screwed onto the coils of the helical spring 1 and can be covered by a housing 14. The housing 14 can be solidly connected to a casing 16. The casing 16 can have vertical ribs or grooves 17. The vertical ribs or grooves 17 form a sliding connection with corresponding grooves or ribs of a disk 18. The disk 18 is secured to the upper end face of the cylindrical helical spring 1. The casing 16 has a lid on its upper end, in the form of a bracing supporting plate 19 that has radial ribs 20. The radial ribs 20 are embodied as extending all the way around and engage counterpart latches of an elastic inlay 21. The elastic inlay 21 is covered with a holding-down device 22. A nut 23 screwed onto a rod 24 of a damper 25 keeps the suspension on an annular supporting surface 26 of the vehicle body via the holding-down device 22 and the elastic inlay 21. The annular supporting surface 26 likewise has radial ribs 27, which also engage the counterpart latches of the elastic inlay 21. The spring plate 15 of the helical spring 1 is located on a pipe 28 of the damper 25. The pipe 28 includes a unit 29 for the lower fixation of the suspension. The spring plate 15 can support a flexible coiled hose 31. The coiled hose 31 covers the coils of the helical spring 1. The upper end of the flexible coiled hose 31 is secured to the housing 14. A flexible connection piece can also be secured to the underside of the controlling device 2. The connection piece wraps around the damper 25 of the suspension and has sliding sealing elements. The sealing elements prevent dirt from getting into the interior of the shaped nut.

The present suspension for motor vehicles with variable chassis clearance, in the embodiment shown in FIGS. 1 through 5, functions as follows: When the controlling device 2 rotates, the number of effective coils of the helical spring 1 under the controlling device varies. These effective coils of the helical spring 1 take on the burden from the vehicle body. The number of effective coils of the helical spring 1 varies in the process as follows: When the number of coils below the controlling device 2 is reduced, the chassis clearance decreases and there is a simultaneous increase in the stiffness of the suspension. In the opposite case, the chassis clearance is increased, and the stiffness of the suspension is reduced. When the chassis clearance decreases, the free spring coils jut out of the nut upward into the casing 16. When the shaped nut that is under load via the coils of the helical spring 1, the helical spring 1 would normally twist somewhat. This unwanted twisting, however, is prevented because the upper free end of the helical spring 1 is secured with the aid of the disk 18, which slides in the ribs or grooves 17 of the casing 16.

The present suspension for motor vehicles with variable chassis clearance, in the embodiment of FIGS. 4 and 5, functions as follows: When the suspension is in operation, the current angle of inclination of the spring coils varies continuously, and the distribution of the stress on the load rollers 7 and the support rollers 8 becomes unequal. This inequality in the distribution of the load on the load rollers 7 is overcome by providing that the bolts 5 of the load rollers 7 are located movably on the springs 36 relative to the coaxial cylindrical bushings 3, 4, which form the shaped nut, and the support rollers 8 are not implemented. The parameters of the springs 36 are selected in accordance with the parameters of the helical spring 1 such that the entire force acting on the helical spring 1 is distributed uniformly via the axles of all of the load rollers 7. The axle of the uppermost load roller 7 in the shaped nut can be installed such that it is immovable. When the suspension is in operation and there is a change in the angle of inclination of the coils of the helical spring 1, the load rollers 7 are distributed differently relative to the shaped nut, specifically this way: When the stress on the helical spring 1 is reduced, the spacing between the upper and lower load rollers 7 is increased; if the stress increases, the spacing decreases. That is, when the suspension is in operation, the amplitude of the oscillations of the load rollers 7 will vary, from a maximum for the lowermost load roller 7 to a zero amplitude at the uppermost load roller 7, when or if its axle is secured immovably in the coaxial cylindrical bushings of the shaped nut.

For the sake of testing the suspension according to the invention, a model of the suspension and a simplified load testing stand was created. This testing stand makes it possible to measure the force necessary for rotating the controlling device. A mass production spring, which is normally used in a passenger car, was acquired. The bent part of the upper coil of this mass-produced spring was cut off. As a result, it was ensured that screwing on the controlling device could be done more easily. After this preparatory step, the spring had the following parameters:

| | |
|---|---|
| Total number of coils | 8 |
| Number of active coils | 7 |
| Diameter of the rod (bar) | 12 mm |
| Outer diameter | 127 mm |
| Coil height of the spring | 51 mm |

A shaped spring nut was made. This spring nut consisted of two round cylindrical bushings, each 100 mm high. The cylindrical bushings were connected concentrically to one another with a gap of 17.5 mm by way of welded bolts that have a diameter of 6 mm. Cylinder rollers with a diameter of 18 mm and a length of 17 mm were located on the bolts. The cylinder rollers were manufactured from steel. The number of cylinder rollers was as follows: load rollers: 20 each; support rollers: 12 each. For the sake of hardening, the surfaces of the joined parts were not additionally reinforced. The surfaces have a roughness of ca. 20 μm and were lubricated with LITOL. The rollers had a symmetrical triangular recess with an angle of 90°; the face ends were rounded off. A lever was welded onto the outer bushing in order to measure the rotary force of the shaped nut under stress.

Step 1 of the test procedures: The shaped nut was located on the uppermost coil of the spring. The spring height below the shaped nut without stress was ca. 350 mm; the initial stress was 110 kp. The spring height below the shaped nut was ca. 300 mm. The nut was rotated downward: The breakaway torque of the shaped nut measured was 0.2 . . . 0.3 kpm. Upon continued rotation, the intended torque dropped considerably and amounted to less than 0.1 kpm. The shaped nut was rotated upward. Because of the rotation of the spring, the shaped nut rotated in stages upward. The breakaway moment was ca. 1.5 kpm, and with continued rotation of the shaped nut it was ca. 1 kpm.

The secondary stress amounted to 330 kp, which is approximately equivalent to the normal stress on the present spring in a vehicle. The spring height below the shaped nut was ca. 200 mm. The nut was rotated downward. The breakaway torque of the shaped nut then was 0.4 . . . 0.5 kpm. With continued rotation, the torque dropped to ca. 0.2 kpm. The shaped nut was rotated upward. To prevent the spring from rotating, the upper spring coil had to be held fast. The breakaway torque amounted to 5 kpm and more. With continued rotation of the shaped nut, the breakaway torque was ca. 3 kpm.

Step 2 of the test procedures: The shaped nut was located in the middle of the spring. The spring height below the shaped nut without stress was ca. 200 mm, the stress 300 kp, and the spring height below the nut ca. 100 mm. The shaped nut was rotated downward. The measured initial breakaway torque then amounted to 0.3 . . . 0.4 kpm. With continued rotation of the shaped nut, the torque dropped to 0.2 kpm. After that, the shaped nut was rotated upward. The rotation proceeded continuously, and the spring did not become twisted. The initial breakaway torque amounted to ca. 4 kpm and upon rotation ca. 3 kpm.

The averaged values of the torques measured of the shaped spring nut are given above. These values had a strong correlation with the uniform course of the controlling device. During the uniform course of the shaped nut, a slight torque was ascertained. Intermittent rotation can be ascribed to the relatively roughly executed roller surfaces.

It is interesting that the presence of coils with a reduced coil height at the end of the spring does not in the least have an adverse effect on the rotation of the shaped nutt. In other words, the rollers push the coils apart when there is a slight increase in force. This means that correct function of the controlling device does not require especially precise spring coiling with respect to either the coil height or the diameter.

Based on the outcomes of testing of the vehicle suspension model under stress for the sake of controlling the chassis clearance and the stiffness of the spring, it can be stated that the requisite functionality of this device under stress is ensured, on the prerequisite of proper completion of the construction of the mating parts (connected parts).

The invention claimed is:

1. A suspension for motor vehicles having controllable chassis clearance and stiffness, including a cylindrical helical spring (1) having a controlling device (2), which is secured to a body of the vehicle and is located rotatably, by means of a transmission stage driven by a drive motor, characterized in that the controlling device (2) is embodied as a shaped nut, which is screwed directly onto individual coils of the helical spring (1) and has roller bodies in the form of upper load rollers (7) and lower support rollers (8) which are located along a helical line, with each roller connected to individual coils of the helical spring; and that the controlling device (2) is fully movable and fixable onto and fixable relative to the helical spring (1).

2. The suspension of claim 1,
characterized in that
the shaped nut is embodied by two coaxial cylindrical guide bushings (3, 4), which are connected with the aid of bolts (5) along the helical lines, and the upper load rollers (7) and the lower support rollers (8) are secured rotatably to the bolts (5) as roller bodies, and the upper load rollers (7) and the lower support rollers (8) are connected to the spring coils, or
that the shaped nut is embodied by two coaxial cylindrical guide bushings (3, 4) that are connected to one another and that have guide lugs (33) and movable rods (34) located between the guide lugs, the rods having springs (36) located thereon, and the rods (34) are solidly connected to bolts (5) via braces (35), which prestress the springs (36), wherein load rollers (7) are secured rotatably as roller bodies to the bolts (5), and the load rollers (7) are connected to the spring coils.

3. The suspension of claim 2,
characterized in that
the roller bodies are located movably along their axis of rotation, preferably along the bolts (5).

4. The suspension of claim 1,
characterized in that
the transmission stage of the drive motor is embodied as a worm gear.

5. The suspension of claim 1,
characterized in that
the transmission stage of the drive motor is embodied as a planetary gear, which is located inside the helical spring (1).

6. The suspension of claim 1,
characterized in that
a flexible coiled hose (31), which covers the coils of the helical spring (1), is secured between the controlling device (2) and a spring plate (15) located below the helical spring (1).

7. The suspension of claim 1,
characterized in that
a flexible brace is secured to an underside of the controlling device (2) and wraps around a damper (25) of the suspension and has sliding sealing elements which prevent the entry of dirt into the an interior of the shaped nut.

* * * * *